United States Patent Office

3,415,848
Patented Dec. 10, 1968

---

3,415,848
ERYTHRONOLIDE B ESTERS
Thomas J. Perun, Waukegan, Ill., assignor to Abbott Laboratories, North Chicago, Ill., a corporation of Illinois
No Drawing. Filed Aug. 26, 1965, Ser. No. 482,906
5 Claims. (Cl. 260—343)

---

ABSTRACT OF THE DISCLOSURE

Alkyl-, aryl-, nitrofuroyl and substituted arylesters of erythronolide B which exhibit antischistosoma properties. At least the 3- and 5-hydroxy groups of the erythronolide B are esterified and optionally, the 11-hydroxy group is also esterified.

---

The present invention is directed to a series of new pharmaceutically useful products; it particularly relates to di- and tri-esters of erythronolide B. These new esters are therapeutically useful to combat infections of schistosomiasis.

Erythronolide B has been described as a hypocholesterolemic agent in U.S. 3,127,315; the molecule carries 3-hydroxy groups, the esterification of which leads to new and pharmaceutically valuable products, with properties different and unexpected from the properties of the known starting materials.

In the new erythronolide B derivatives to which this invention is directed, at least two of the three hydroxy groups are replaced by acyl groups to form esters of the formula $E(OCOAR)_nH_m$, wherein E signifies the trivalent erythronolide B radical, $n$ is 2 or 3 and $m$ is 1 or 0, with $n+m=3$; A is a divalent hydrocarbon radical selected from loweralkyl, furyl and phenyl, and R is hydrogen, chlorine, bromine, nitro, amino or methyl.

The three hydroxy groups of the erythronolide B radical which may be esterified are in the 3-, 5- and 11-positions. Apparently the 3-position is the most active: esterification with active derivatives of acids of the formula RACOOH wherein R and A have the above-defined meaning always takes place at the 3-position whether both, the 5- and 11-positions or only one of these additional positions are also esterified.

In a simple embodiment of the present invention, erythronolide B is dissolved in a suitable inert and anhydrous solvent and the solution is treated with an active derivative of the above-described acid, e.g. the anhydride or acid chloride, preferably in the presence of an organic acid-binder soluble in the reaction medium. After a period of standing or heating, the reaction mixture is poured in ice-water and the solid obtained is filtered and recrystallized from a suitable solvent system. Depending on the conditions and length of heating period, the erythronolide B is esterified in two or three of the positions where initially hydroxy groups were attached to the erythronolide ring.

To show some specific embodiments, reference is made to the following examples which are given here as examples only and are not meant to limit the invention.

Example 1.—3,5,11-tribenzoylerythronolide B

A solution of 2.0 g. of erythronolide B dissolved in 25 ml. of dry pyridine is coiled in an ice-bath while 3 ml. of benzoyl chloride are added. The solution is stirred at 0° C. for one hour and then left at room temperature for 11 days. The reaction mixture is poured into ice-water forming a gummy precipitate which solidifies after standing for several hours. The solid is filtered, washed and dried to give 3.5 g. of a tan powder. The powder is slurried with ether and the soluble material is filtered to leave 2.3 g. of 3,5,11-tribenzoylerythronolide B which upon recrystallization from ethanol is obtained in colorless needles melting at 208–210° C. The analytical values are in agreement with those calculated from the empirical formula $C_{42}H_{50}O_{10}$.

Example 2.—3,5-di-p-nitrobenzoylerythronolide B

To a solution of 4.0 g. of erythronolide B in 50 ml. of dry pyridine, 5.0 g. of p-nitrobenzoyl chloride is added. While the acid chloride dissolves, the solution becomes warm and when warming ceases, a solid starts to separate. The reaction mixture is heated for 3 hours to 55° C. and thereafter poured into ice-water. The aqueous pyridine is decanted from the gummy solid and diluted hydrochloric acid is added to the solid. After leaving the solution overnight at room temperature, the powdered solid formed is filtered and allowed to stand in 5% sodium bicarbonate overnight. The solid is filtered, washed with water, dried and recrystallized from methanol/benzene to give the finely crystalline colorless 3,5-di-p-nitrobenzoylerythronolide B, melting at 246–247° C. The analytical values are in agreement with those calculated from the empirical formula $C_{35}H_{44}O_{13}N_2$.

Example 3.—3,5,11-tri-(5-nitro-2-furoyl)erythronolide B

A solution of 5.0 g. of erythronolide B in 100 ml. of dry pyridine is stirred in an ice-bath while 6.5 g. of 5-nitro-2-furoyl chloride is added. The solution is stirred 2 hours at 0° C. and then left 24 hours at room temperature. The mixture is poured into ice-water and the formed gum is separated and allowed to stand in 5% sodium bicarbonate solution for a few days. The formed powder is washed, dried and recrystallized from dimethylformamide/water to give 5.0 g. of yellow needles of crude 3,5,11-tri-(5-nitro-2-furoyl)erythronolide B, melting at 203–205° C. Removal of solvate under vacuum gives the pure product melting at 200–203° C. and analyzing correctly for the compound of empirical formula $C_{36}H_{41}O_{19}N_3$.

Example 4.—3,5,11-triacetylerythronolide B

A solution of 10 g. of erythronolide B in 100 ml. of dry pyridine is combined with 40 ml. of acetic anhydride. The solution is heated on a steam-bath for 16 hours and thereafter cooled and poured into 500 ml. of ice-water. The solid formed is filtered, washed with water, dried and recrystallized from ethanol-water 1:1 to give 9.5 g. of the colorless needles of 3,5,11-triacetylerythronolide B melting at 190–191° C. The analytical values are in close agreement with those calculated for the empirical formula $C_{27}H_{44}O_{10}$.

Example 5.—3,5,11-tricaproylerythronolide B

By replacing the acetic anhydride in Example 4 with hexanoyl chloride in equimolar proportions, 3,5,11-tricaproylerythronolide B is obtained which analyzes correctly for the compound of empirical formula $C_{39}H_{68}O_{10}$.

Example 6.—3,5-di-p-aminobenzoylerythronolide B

A solution of 1.3 g. of the product of Example 2 in 100 ml. of ethanol is catalytically hydrogenated in the presence of 0.125 g. of 5% palladium-on-carbon as the catalyst with gaseous hydrogen at 30° C. under 42 p.s.i.g. pressure. When the calculated amount of hydrogen is absorbed, the catalyst is filtered off and the filtrate is evaporated. The solid so obtained is recrystallized from ethanol/water to give 3,5-di-p-aminobenzoylerythronolide B of which the analysis is in close agreement with the calculated values for the compound of empirical formula $C_{35}H_{48}O_9N_2$.

Example 7.—3,5,11-tri-(p-chlorobenzoyl)erythronolide B

By following the procedure of Example 1, but substituting the benzoyl chloride used there with an equimolar amount of p-chlorobenzoylchloride, 3,5,11-tri-(p-chlorobenzoyl)erythronolide B is obtained which analyzes correctly for the compound of empirical formula $C_{42}H_{47}O_{10}Cl_3$.

Example 8.—3,5,11-tri-(m-bromobenzoyl) erythronolide B

By replacing the benzoyl chloride used in Example 1 with the equimolar amount of m-bromobenzoyl chloride, the procedure outlined produces 3,5,11-tri-(m-bromobenzoyl)-erythronolide B which analyzes correctly for the compound of empirical formula $C_{42}H_{47}O_{10}Br_3$.

Example 9.—3,5,11-tri-(o-tolyl)erythronolide B

By following the procedure of Example 1, but substituting o-tolyl chloride for the benzoyl chloride used above, 3,5,11-tri-(o-tolyl)erythronolide B is obtained which analyzes correctly for the compound of empirical formula $C_{45}H_{56}O_{10}$.

Example 10.—3,5,11-tri-(3-bromopropionyl) erythronolide B

By following the procedure given in Example 4, above, but substituting acetic anhydride with an equimolar amount of 3-bromopropionyl chloride, 3,5,11-tri-(3-bromopropionyl)erythronolide B is obtained in good yield; the analytical values are in agreement with those calculated for the compound of empirical formula $C_{30}H_{47}O_{10}Br_3$.

It will be seen from the above examples that the hydroxy groups in the 3-, 5- and 11-position can very easily be converted to the acyl groups, thus producing the di- or triesters of erythronolide B. Where only two of the initial hydroxy groups of the erythronolide B are esterified in an initial reaction, the third hydroxy group can subsequently be esterified with an active derivative of a different fatty or aromatic acid.

The compounds made in this manner are active against parasitic infections, particularly against schistosomiasis infections. Excellent results are obtained by treating warm-blooded animals infected with *S. mansoni* by intraperitoneal injections of 10 mg./kg./day for one to five days. With some of the new compounds, 5 mg./kg. is effective while other compounds are preferably injected in larger doses. Some of the compounds can easily be administered in doses as high as 100 mg./kg. intraperitoneally, but usually such high doses are not needed except when only a single treatment is possible.

Others may practice the invention in any of the numerous ways which will be suggested to one skilled in the art by the present disclosure. All such practice of the invention is considered a part hereof provided it falls within the scope of the appended claims.

I claim:

1. An erythronolide B derivative in which the hydroxy groups in the 3- and 5-position or in the 3-, 5- and 11-position are replaced by an acyl group of the formula

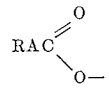

wherein A is selected from the group consisting of lower-alkyl, phenyl and 2-furyl, and wherein R is hydrogen, chlorine, bromine, nitro, amino or methyl.

2. 3,5,11-tribenzoylerythronolide B.
3. 3,5-di-p-nitrobenzoylerythronolide B.
4. 3,5,11-tri-(5-nitro-2-furoyl)erythronolide B.
5. 3,5,11-triacetylerythronolide B.

References Cited

UNITED STATES PATENTS 3,127,315   3/1964   Tardrew et al. _____ 167—65

OTHER REFERENCES

Hung et al.: J. of Biol. Chem., vol. 240, No. 3, pp. 1322–6 (March 1965).

Burger et al.: Medicinal Chem. (Interscience Pub., Inc. New York, 1960), pp. 924–8.

Sigal et al.: J.A.C.S., vol. 78, No. 2, pp. 388–95, Jan. 20, 1956

HENRY R. JILES, *Primary Examiner.*

C. M. SHURKO, *Assistant Examiner.*

U.S. Cl. X.R.

167—65